July 13, 1948. T. H. TROLLER 2,444,966
FAN AND MOTOR DEVICE
Filed Jan. 29, 1944 2 Sheets-Sheet 1

INVENTOR.
Theodor H. Troller
BY
Hoodling and Krost
Attys

July 13, 1948. T. H. TROLLER 2,444,966
FAN AND MOTOR DEVICE
Filed Jan. 29, 1944 2 Sheets-Sheet 2

INVENTOR.
Theodor H. Troller
BY Hoodling and Krost
attys.

Patented July 13, 1948

2,444,966

UNITED STATES PATENT OFFICE 2,444,966

FAN AND MOTOR DEVICE

Theodor H. Troller, New Philadelphia, Ohio, assignor, by mesne assignments, to Joy Manufacturing Company, a corporation of Pennsylvania Application January 29, 1944, Serial No. 520,183

13 Claims. (Cl. 230—117)

The invention relates in general to a fan and motor housing and more particularly to a fan and motor housing for an axial flow fan.

An object of the invention is the provision of a fan and motor housing in which the motor and fan may be readily mounted and aligned within the housing.

Another object of the invention is the provision of mounting the electric motor in a receptacle, in which the outer surface of the receptacle is substantially co-extensive with the nose-like hub of the fan and in which the rear end of the receptacle is tapered to give a gradual reduction in the diameter of the blocked area for minimizing air turbulence as the air leaves the receptacle.

Another object of the invention is the provision of mounting the electric motor which drives the fan in a receptacle having an open end upon which an outwardly extending flange of the motor abuts and is secured thereto, the rear end of the receptacle being tapered to minimize air turbulence as the air leaves the receptable.

Another object of the invention is the provision of shoulder means in cooperation with the opened end of the receptacle for aligning the motor substantially concentric within the outer housing through which the fan driven air flows.

Another object of the invention is the provision of a fan and motor housing in which the motor and fan are so mounted and aligned within the housing that the tip clearance between the fan and the housing may be maintained at a close minimum.

Other objects and a fuller understanding of the invention may be had by referring to the following description and claims, taken in conjunction with the accompanying drawing, in which:

Figures 1, 2, 3:
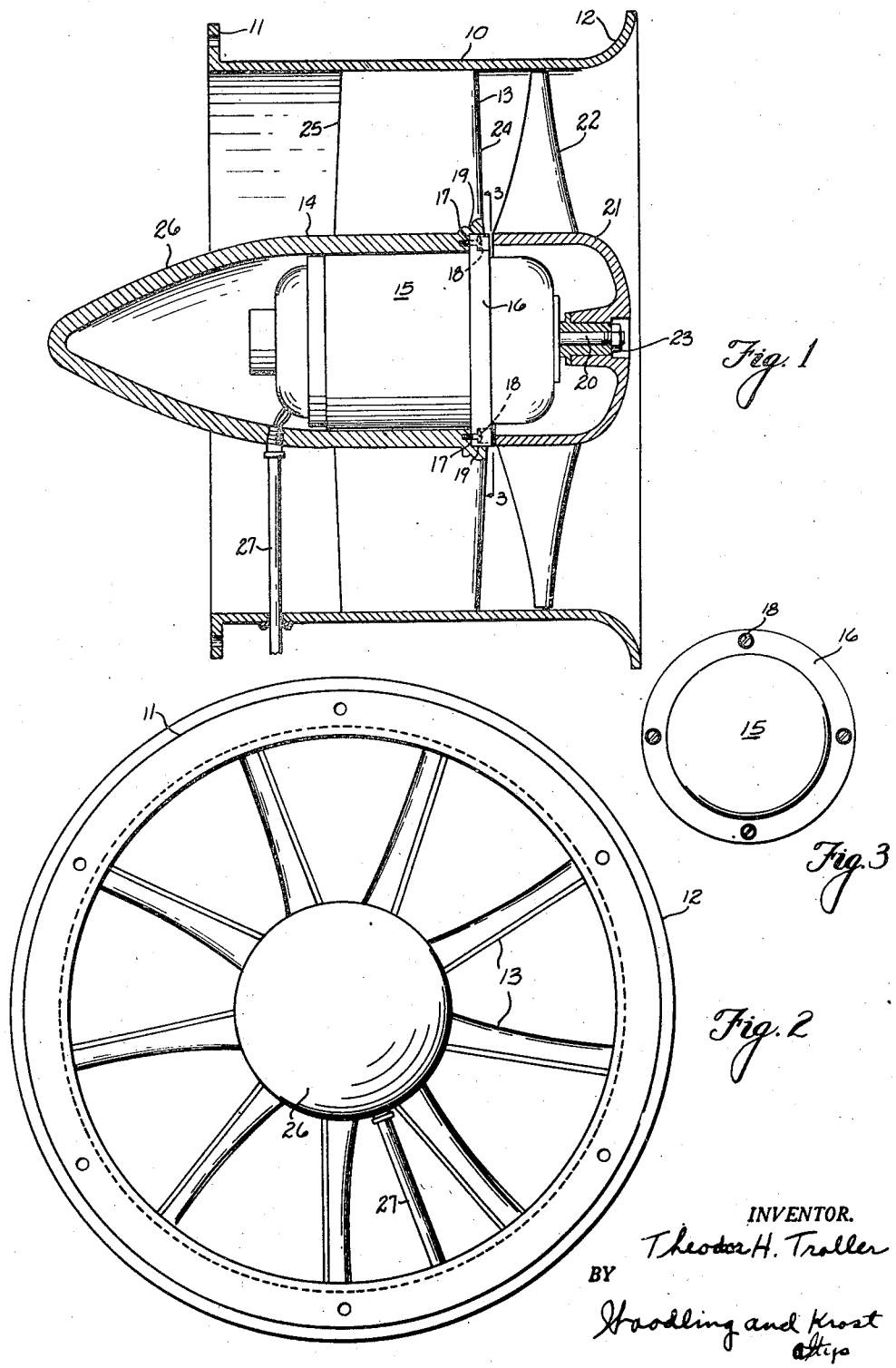
Figure 1 is a longitudinal cross-sectional view of the fan and motor housing embodying the features of the invention.
Figure 2 is a rear view of the device shown in Figure 1.
Figure 3 is a view taken along the line 3—3 of Figure 1, and shows the outwardly extending flange on the motor frame and the screws which hold the motor to the receptacle in which the motor is mounted, the cross-section of the internal parts of the motor being not shown for the purpose of clarity.
Figure 4:
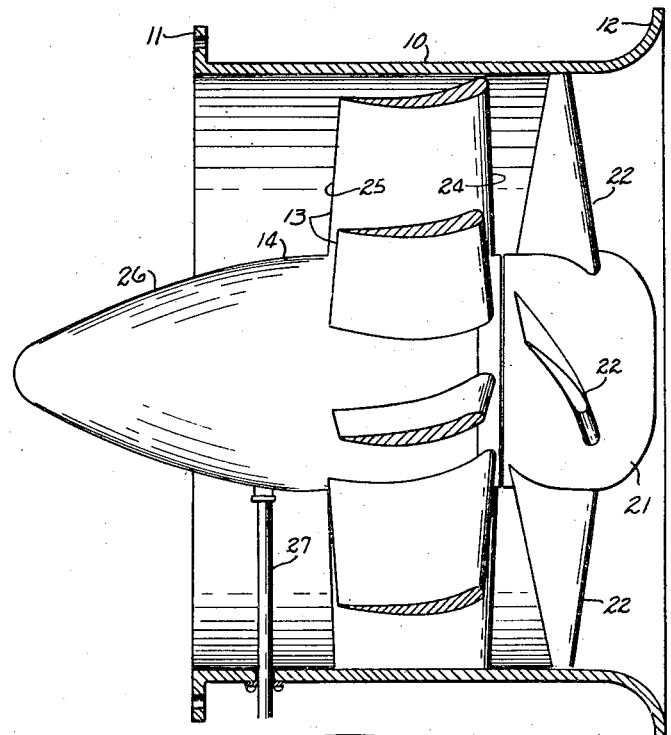
Figure 4 is a longitudinal cross-sectional view of the outside main air duct with the other parts shown in side elevational view.
Figure 5:
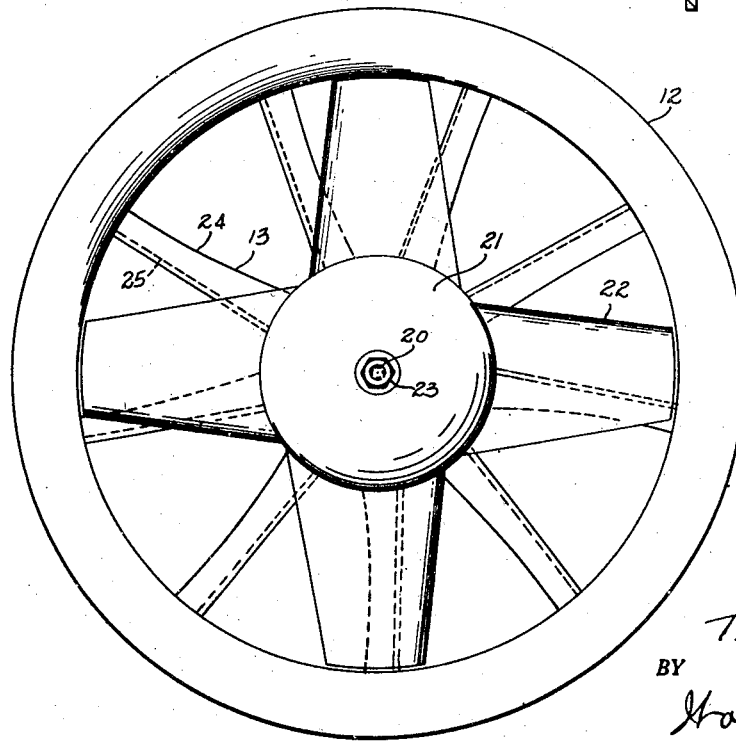
Figure 5 is a front view of the device shown in Figures 1 and 4.

With reference to the drawing, the fan and motor housing comprises a cast, monobloc structure having an outer annular wall 10 and a plurality of air guide vanes 13 integrally connected thereto. The air guide vanes 13 are stationary and are angularly spaced around the outer annular wall and extend inwardly toward the center of the housing. The inner ends of the stationary vanes 13 are integrally connected to a cup-shaped receptacle 14 and thereby support the cup-shaped receptacle 14 substantially concentric within the outer annular wall 10. The forward end of the outer annular wall 10 is provided with an outwardly flared portion 12 to receive the incoming air. The rear end of the outer annular wall may be provided with a connecting flange 11 whereby the housing may be suitably fastened to other conducting ducts which are not shown.

An electric motor 15 which drives the fan 22, is arranged to be mounted within the cup-shaped receptacle 14. As illustrated, the fan 22 includes a nose-like hub 21 which may be suitably fastened to the motor shaft 20 by means of a nut 23. The motor is provided with an outwardly extending abutment means 16 which is in the form of a flange and is arranged to abut against a transversely disposed abutment brim surface 17 upon the forward or open end of the cup-shaped receptacle 14. The outwardly extending abutment means of the motor may be secured to the transversely disposed abutment brim surface 17 of the cup-shaped receptacle 14 by means of screws 18, see Figures 1 and 3.

As illustrated, the leading edges 24 of the vanes extend forwardly of the transversely disposed abutment surface 17 to form shoulder portions 19. The outwardly extending abutment means 16 fits within the shoulder portions 19 and axially aligns the motor shaft 20 and the fan 22 substantially concentric within the outer annular wall 10.

The outer surface of the cup-shaped receptacle 14 is substantially coextensive with the nose-like hub 21 of the fan. At a place in the neighborhood of the trailing edge 25 of the stationary vanes the outer surface of the cup-shaped receptacle begins to taper inwardly to give a tapered surface over which the fan driven air flows to minimize air turbulence as the air leaves the cup-shaped receptacle. The tapered end is designated by the reference character 26 and presents a gradual reduction in the diameter of the blocked area of the air stream which is effected by the nose-like hub 21 of the fan and the coextensive outer annular surface of the cup-shaped receptacle.

A conduit 27 extends from the outer annular wall 10 to the cup-shaped receptacle and is arranged to carry an electric cable for energizing the motor 15. The main body of the motor 15 may be received within the cup-shaped receptacle 14 with a small clearance and the mounting and aligning of the motor 14 is effected by the outwardly extending abutment means 16 or flange of the motor engaging the transversely disposed abutment brim surface 17 of the cup-shaped receptacle, in combination with the screws 18.

The outwardly extending abutment means 16 may be of a form different than that illustrated in the drawings, in that it may comprise a plate fastened to the forward end of the motor, so that the peripheral edge of the plate may be connected to the cup-shaped receptacle for supporting the motor. The plate may be of one piece or of segmental pieces. Also, the tapered end 26 may be more blunt than that illustrated in the drawings.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In an axial flow fan structure comprising an electric motor having a shaft with a fan including a hub and outwardly extending blades mounted on said shaft, the improvement of a fan and a motor housing comprising a structure having an outer annular wall, a centrally disposed cup-shaped receptacle, and a plurality of stationary vanes having their outer ends connected to the outer annular wall and having their inner ends connected to the cup-shaped receptacle, said stationary vanes having leading and trailing edges and supporting the cup-shaped receptacle substantially concentric within the outer annular wall, said cup-shaped receptacle comprising an annular body having an outer surface substantially co-extensive with the hub of the fan and having an opened end to receive the motor and a tapered end extending rearwardly of the trailing edges of the stationary vanes and converging inwardly to give a tapered surface over which the fan driven air flows to minimize air turbulence as the air leaves the cup-shaped receptacle, said opened end having a transversely disposed abutment brim surface, said motor having outwardly extending abutment means and being mounted in the cup-shaped receptacle with the outwardly extending abutment means abutting against the transversely disposed abutment brim surface and with the hub of the fan positioned in advance of the opened end of the cup-shaped receptacle, and means securing the outwardly extending abutment means to the transversely disposed abutment brim surface for holding the motor against longitudinal movement, the leading edges of the stationary vanes at their inner ends extending forwardly of the transversely disposed abutment brim surface to form shoulder portions, said outwardly extending abutment means engaging said shoulder portions and axially aligning the motor shaft and fan substantially concentric within the outer annular wall.

2. In an axial flow fan structure comprising an electric motor having a shaft with a fan including a hub and outwardly extending blades mounted on said shaft, the improvement of a fan and a motor housing comprising a structure having an outer annular wall, a centrally disposed cup-shaped receptacle, and a plurality of stationary vanes having their outer ends connected to the outer annular wall and having their inner ends connected to the cup-shaped receptacle, said stationary vanes having leading and trailing edges and supporting the cup-shaped receptacle substantially concentric within the outer annular wall, said cup-shaped receptacle comprising an annular body having an outer surface substantially co-extensive with the hub of the fan and having an opened end to receive the motor and a tapered closed end extending rearwardly of the trailing edges of the stationary vanes and converging inwardly to give a tapered surface over which the fan driven air flows to minimize air turbulence as the air leaves the cup-shaped receptacle, said opened end having a transversely disposed abutment brim surface, said motor having outwardly extending abutment means and being mounted in the cup-shaped receptacle with the outwardly extending abutment means abutting against the transversely disposed abutment brim surface and with the hub of the fan positioned in advance of the opened end of the cup-shaped receptacle, and means securing the outwardly extending abutment means to the transversely disposed abutment brim surface for holding the motor against longitudinal movement, the leading edges of the stationary vanes at their inner ends extending forwardly of the transversely disposed abutment brim surface to form shoulder portions, said outwardly extending abutment means engaging said shoulder portions and axially aligning the motor shaft and fan substantially concentric within the outer annular wall.

3. In an axial flow fan structure comprising an electric motor having a shaft with a fan including a hub and outwardly extending blades mounted on said shaft, the improvement of a fan and motor housing comprising an integral cast structure having an outer annular wall, a centrally disposed cup-shaped receptacle, and a plurality of stationary vanes having their outer ends cast to the outer annular wall and having their inner ends cast to the cup-shaped receptacle, said stationary vanes having leading and trailing edges and supporting the cup-shaped receptacle substantially concentric within the outer annular wall, said cup-shaped receptacle comprising an annular body having an outer surface substantially co-extensive with the hub of the fan and having an opened end to receive the motor and a tapered end extending rearwardly of the trailing edges of the stationary vanes and converging inwardly to give a tapered surface over which the fan driven air flows to minimize air turbulence as the air leaves the cup-shaped receptacle, and means for mounting the motor in the cup-shaped receptacle with the hub of the fan positioned in advance of the opened end of the cup-shaped receptacle.

4. In an axial flow fan structure comprising an electric motor having a shaft with a fan including a hub and outwardly extending blades mounted on said shaft, the improvement of a fan and motor housing comprising an integrally cast structure having an outer annular wall, a centrally disposed cup-shaped receptacle, and a plurality of stationary vanes having their outer ends cast to the outer annular wall and having their inner ends cast to the cup-shaped receptacle, said stationary vanes having leading and trailing edges and supporting the cup-shaped receptacle substantially concentric within the outer annular wall, said cup-shaped receptacle comprising an annular body having an outer surface substantially co-extensive with the hub of the fan and having an opened end to receive the motor and a tapered end extending rearwardly of the trailing edges of the stationary vanes and converging inwardly to give a tapered surface over which the fan driven air flows to minimize air turbulence as the air leaves the cup-shaped receptacle, and means including an abutment surface on the cup-shaped receptacle and abutment means on the motor for mounting the motor in the cup-shaped receptacle with the hub of the fan positioned in advance of the opened end of the cup-shaped receptacle, and shoulder means angularly disposed with reference to the abutment surface against which the abutment means engages to axially align the motor shaft and fan substantially concentric within the outer annular wall.

5. In an axial flow fan structure comprising an electric motor having a shaft with a fan including a hub and outwardly extending blades mounted on said shaft, the improvement of a fan and a motor housing comprising an integrally cast structure having an outer annular wall, a centrally disposed cup-shaped receptacle, and a plurality of stationary vanes having their outer ends cast to the outer annular wall and having their inner ends cast to the cup-shaped receptacle, said stationary vanes having leading and trailing edges and supporting the cup-shaped receptacle substantially concentric within the outer annular wall, said cup-shaped receptacle comprising an annular body having an outer surface substantially co-extensive with the hub of the fan and having an opened end to receive the motor and a tapered end extending rearwardly of the trailing edges of the stationary vanes and converging inwardly to give a tapered surface over which the fan driven air flows to minimize air turbulence as the air leaves the cup-shaped receptacle, said opened end having a transversely disposed abutment brim surface, said motor having outwardly extending abutment means and being mounted in the cup-shaped receptacle with the outwardly extending abutment means abutting against the transversely disposed abutment brim surface and with the hub of the fan positioned in advance of the opened end of the cup-shaped receptacle, means securing the outwardly extending abutment means to the transversely disposed abutment brim surface for holding the motor against longitudinal movement, and shoulder means extending forwardly of the transversely disposed abutment brim surface against which said outwardly extending abutment means engages for axially aligning the motor shaft and fan substantially concentric within the outer annular wall.

6. In an axial flow fan structure comprising an electric motor having a shaft with a fan including a hub and outwardly extending blades mounted on said shaft, the improvement of a fan and a motor housing comprising an integrally cast structure having an outer annular wall, a centrally disposed cup-shaped receptacle, and a plurality of stationary vanes having their outer ends cast to the outer annular wall and having their inner ends cast to the cup-shaped receptacle, said stationary vanes supporting the cup-shaped receptacle substantially concentric within the outer annular wall, said cup-shaped receptacle comprising an annular body having an outer surface substantially co-extensive with the hub of the fan and having an opened end to receive the motor, said opened end having a transversely disposed abutment brim surface, said motor having outwardly extending abutment means and being mounted in the cup-shaped receptacle with the outwardly extending abutment means abutting against the transversely disposed abutment brim surface and with the hub of the fan positioned in advance of the opened end of the cup-shaped receptacle, means securing the outwardly extending abutment means to the transversely disposed abutment brim surface for holding the motor against longitudinal movement, and shoulder means extending forwardly of the transversely disposed abutment brim surface against which said outwardly extending abutment means engages for axially aligning the motor shaft and fan substantially concentric within the outer annular wall.

7. In an axial flow fan structure comprising an electric motor having a shaft with a fan including a hub and outwardly extending blades mounted on said shaft, the improvement of a fan and a motor housing comprising a structure having an outer annular wall, a centrally disposed cup-shaped receptacle, and a plurality of stationary vanes having their outer ends connected to the outer annular wall and having their inner ends connected to the cup-shaped receptacle, said stationary vanes having leading and trailing edges and supporting the cup-shaped receptacle substantially concentric within the outer annular wall, said cup-shaped receptacle comprising an annular body having an outer surface substantially co-extensive with the hub of the fan and having an opened end to receive the motor, said opened end having a transversely disposed abutment brim surface, said motor having outwardly extending abutment means and being mounted in the cup-shaped receptacle with the outwardly extending abutment means abutting against the transversely disposed abutment brim surface and with the hub of the fan positioned in advance of the opened end of the cup-shaped receptacle, and means securing the outwardly extending abutment means to the transversely disposed abutment brim surface for holding the motor against longitudinal movement, the leading edges of the stationary vanes at their inner ends extending forwardly of the transversely disposed abutment surface to form shoulder portions and axially aligning the motor shaft and fan substantially concentric within the outer annular wall.

8. In an axial flow fan structure comprising an electric motor having a shaft with a fan including a hub and outwardly extending blades mounted on said shaft, the improvement of a fan and a motor housing comprising a structure having an outer annular wall, a centrally disposed annular body, and a plurality of stationary vanes having their outer ends connected to the outer annular wall and having their inner ends connected to the annular body, said stationary vanes having leading and trailing edges and supporting the annular body substantially concentric within the outer annular wall, said annular body having an outer surface substantially co-extensive with the hub of the fan, said annular body having a transversely disposed abutment surface, said motor having outwardly extending abutment means, said motor being mounted in the annular body with the outwardly extending abutment means abutting against the transversely disposed abutment surface and with the hub of the fan positioned in advance of the annular body, and means securing the outwardly extending abutment means to the transversely disposed abutment surface for holding the motor against longitudinal movement, the leading edges of the stationary vanes at their inner ends extending forwardly of the transversely disposed abutment surface to form shoulder portions, said outwardly extending abutment means engaging said shoulder portions and axially aligning the motor shaft and fan substantially concentric within the outer annular wall.

9. In an axial flow fan structure comprising an electric motor having a shaft with a fan including a hub and outwardly extending blades mounted on said shaft, the improvement of a fan and a motor housing comprising an integrally cast structure having an outer annular wall, a centrally disposed annular body, and a plurality of stationary vanes having their outer ends cast to the outer annular wall and having their inner ends cast to the annular body, said stationary vanes supporting the annular body substantially concentric within the outer annular wall, said annular body having an outer surface substantially co-extensive with the hub of the fan and having an open end to receive the motor, said annular body at said open end having a transversely disposed abutment surface, said motor having a body provided with outwardly extending abutment means, said motor body being mounted in the annular body with the outwardly extending abutment means abutting against the transversely disposed abutment surface and with the hub of the fan positioned in advance of the annular body, means securing the outwardly extending abutment means to the transversely disposed abutment surface for holding the motor against longitudinal movement, and shoulder means extending forwardly of the transversely disposed abutment surface against which said outwardly extending abutment means engages for axially aligning the motor shaft and fan substantially concentric within the outer annular wall.

10. The improvement of a motor mounting comprising an integrally cast structure having an annular supporting wall, a centrally disposed annular body, and a plurality of stationary vanes having their outer ends cast to the annular supporting wall and having their inner ends cast to the annular body, said stationary vanes supporting the annular body substantially concentric within the annular supporting wall, said annular body having an opened end to receive the motor, said opened end having a transversely disposed abutment brim surface, means including abutment means for mounting the motor in the annular body with the abutment means abutting against the transversely disposed abutment brim surface, means securing the abutment means to the transversely disposed abutment brim surface for holding the motor against longitudinal movement, and shoulder means defined by said stationary vanes extending forwardly of the transversely disposed abutment brim surface against which said abutment means engages for axially aligning the motor substantially concentric within the outer annular wall.

11. In an axial flow fan structure comprising an electric motor having a shaft with a fan including a hollow hub and outwardly extending blades mounted on said shaft, the improvement of a fan and a motor housing comprising an integrally cast structure having an outer annular wall, a centrally disposed annular body, and a plurality of stationary vanes having their outer ends cast to the outer annular wall and having their inner ends cast to the annular body, said stationary vanes supporting the annular body substantially concentric within the outer annular wall, said annular body having an outer surface substantially co-extensive with the hub of the fan and having an opened end to receive the motor, said opened end having a transversely disposed abutment surface, said motor having a body portion and an end portion and being provided with outwardly extending abutment means intermediate the body portion and the end portion, means for mounting the body portion of the motor in the annular body with the abutment means abutting against the transversely disposed abutment surface and with the end portion of the motor extending into the hollow hub of the fan, means securing the abutment means to the transversely disposed abutment surface for holding the motor against longitudinal movement, and shoulder means extending forwardly of the transversely disposed abutment surface against which said abutment means engages for axially aligning the motor shaft and fan substantially concentric within the outer annular wall.

12. In an axial flow fan structure comprising an electric motor having a shaft with a fan mounted thereon, the improvement of a fan and motor housing comprising a structure having an outer annular wall, a centrally disposed annular body, and a plurality of stationary vanes having their outer ends connected to the outer annular wall and having their inner ends connected to the annular body, said stationary vanes supporting the annular body within the outer annular wall, said annular body having a transversely disposed abutment surface, said motor having outwardly extending abutment means, said motor being mounted in the annular body with the outwardly extending abutment means abutting against the transversely disposed abutment surface, and means securing the outwardly extending abutment means to the transversely disposed abutment surface for holding the motor against longitudinal movement, the stationary vanes at their inner ends having shoulder portions angularly disposed with reference to the transversely disposed abutment surface, said outwardly extending abutment means engaging said shoulder portions and axially aligning the motor shaft and fan substantially concentric within the outer annular wall.

13. In an axial flow fan structure comprising an electric motor having a shaft with a fan including a hub and outwardly extending blades mounted on said shaft, the improvement of a monobloc fan and motor housing comprising an outer annular wall, a centrally disposed cup-shaped receptacle and a plurality of stationary vanes all formed together as an integral one-piece unit, said stationary vanes supporting the cup-shaped receptacle substantially concentric within the outer annular wall, said cup-shaped receptacle comprising an annular body having an outer surface substantially coextensive with the hub of the fan and having an opened end to receive the motor, said opened end having a transversely disposed abutment brim surface, said motor having outwardly extending abutment means and being mounted in the cup-shaped receptacle with the outwardly extending abutment means abutting against the transversely disposed abutment brim surface and with the hub of the fan positioned opposite the opened end of the cup-shaped receptacle, means securing the outwardly extending abutment means to the transversely disposed abutment brim surface for holding the motor against longitudinal movement, and shoulder means angularly disposed with reference to the transversely disposed abutment brim surface against which said outwardly extending abutment means engages for axially aligning the motor shaft and fan substantially concentric within the outer annular wall.

THEODOR H. TROLLER.

REFERENCES CITED

The following references are of record in the file of this patent:

UNITED STATES PATENTS

| Number | Name | Date |
|---|---|---|
| 1,932,231 | Schmidt | Oct. 24, 1933 |
| 2,142,307 | DeMey et al. | Jan. 3, 1939 |
| 2,335,508 | Gustafsson et al. | Nov. 30, 1943 |
| 2,339,602 | Hagen | Jan. 18, 1944 |